(12) United States Patent
Suenaga et al.

(10) Patent No.: US 9,167,901 B2
(45) Date of Patent: Oct. 27, 2015

(54) SEAT PAD AND METHOD FOR MANUFACTURING THE SAME

(75) Inventors: Kazuyuki Suenaga, Tosu (JP); Yousuke Muta, Tosu (JP)

(73) Assignee: BRIDGESTONE CORPORATION, Tokyo (JP)

( * ) Notice: Subject to any disclaimer, the term of this patent is extended or adjusted under 35 U.S.C. 154(b) by 100 days.

(21) Appl. No.: 13/825,707

(22) PCT Filed: Aug. 31, 2011

(86) PCT No.: PCT/JP2011/069777
§ 371 (c)(1),
(2), (4) Date: Mar. 22, 2013

(87) PCT Pub. No.: WO2012/039248
PCT Pub. Date: Mar. 29, 2012

(65) Prior Publication Data
US 2013/0181499 A1    Jul. 18, 2013

(30) Foreign Application Priority Data

Sep. 24, 2010    (JP) ................................. 2010-213766

(51) Int. Cl.
| | |
|---|---|
| A47C 7/24 | (2006.01) |
| B68G 11/04 | (2006.01) |
| B29C 44/12 | (2006.01) |
| B29C 44/38 | (2006.01) |
| B29C 44/58 | (2006.01) |

(Continued)

(52) U.S. Cl.
CPC ............... *A47C 7/24* (2013.01); *B29C 44/1266* (2013.01); *B29C 44/1271* (2013.01); *B29C 44/386* (2013.01); *B29C 44/582* (2013.01); *B68G 11/04* (2013.01); *B29K 2075/00* (2013.01); *B29K 2313/00* (2013.01); *B29L 2031/771* (2013.01)

(58) Field of Classification Search
USPC ............. 297/452.21, 452.13, DIG. 1, DIG. 2, 297/180.1
See application file for complete search history.

(56) References Cited

U.S. PATENT DOCUMENTS

| | | | | |
|---|---|---|---|---|
| 4,558,905 | A | * | 12/1985 | Natori ......................... 297/452.6 |
| 5,105,491 | A | * | 4/1992 | Yoshiyuki et al. .............. 5/655.9 |
| 5,211,697 | A | * | 5/1993 | Kienlein et al. .......... 297/452.42 |

(Continued)

FOREIGN PATENT DOCUMENTS

| | | |
|---|---|---|
| JP | 60-240414 A | 11/1985 |
| JP | 05-185439 A | 7/1993 |

(Continued)

*Primary Examiner* — David R Dunn
*Assistant Examiner* — Timothy J Brindley
(74) *Attorney, Agent, or Firm* — Sughrue Mion, PLLC

(57) ABSTRACT

A seat pad and a method for manufacturing the same are provided, wherein molding failure is prevented at the periphery of a horizontal groove. In the seat pad, a groove structure 7 for containing a part of a seat cover material is provided on a seat surface for seating. At least a part of the groove structure is formed as a horizontal groove which extends in a horizontal direction. The seat pad is manufactured by foam molding in a mold with the seat surface maintained to face in a downward direction, and a first end of the seat surface, in terms of a longitudinal direction of the seat pad which crosses the horizontal direction thereof at right angle, positioned lower than a second end thereof. The seat pad has at least one concavity 10 positioned between the first end and the horizontal groove, so as to face the horizontal groove.

2 Claims, 12 Drawing Sheets

(51) Int. Cl.
*B29L 31/00* (2006.01)
*B29K 75/00* (2006.01)

(56) References Cited

U.S. PATENT DOCUMENTS

| | | | |
|---|---|---|---|
| 5,238,513 A * | 8/1993 | Gill | 156/64 |
| 5,643,385 A * | 7/1997 | Kikuchi et al. | 156/212 |
| 5,944,389 A * | 8/1999 | Zenba et al. | 297/452.48 |
| 6,672,671 B1 * | 1/2004 | Stoschek | 297/452.57 |
| 6,783,184 B2 * | 8/2004 | DiBattista et al. | 297/452.14 |
| 6,893,087 B2 * | 5/2005 | Hancock et al. | 297/219.11 |
| 7,334,278 B2 * | 2/2008 | Yamasaki | 5/653 |
| 7,607,738 B2 * | 10/2009 | Gregory et al. | 297/452.23 |
| 7,931,333 B2 * | 4/2011 | Sung et al. | 297/217.2 |
| 8,128,174 B2 * | 3/2012 | Brunner et al. | 297/452.18 |
| 8,678,505 B2 * | 3/2014 | Kanda et al. | 297/452.15 |
| 8,821,777 B2 * | 9/2014 | San Miguel et al. | 264/225 |
| 2002/0195864 A1 * | 12/2002 | Tobisawa et al. | 297/452.1 |
| 2006/0170274 A1 * | 8/2006 | Moule | 297/452.25 |
| 2009/0058167 A1 * | 3/2009 | San Miguel et al. | 297/452.48 |

FOREIGN PATENT DOCUMENTS

| | | |
|---|---|---|
| JP | 2006-095778 A | 4/2006 |
| JP | 2008-073441 A | 4/2008 |

* cited by examiner

SEAT PAD AND METHOD FOR MANUFACTURING THE SAME

CROSS REFERENCE TO RELATED APPLICATIONS

This application is a National Stage of International Application No. PCT/JP2011/069777, filed on Aug. 31, 2011, which claims priority from Japanese Patent Application No. 2010-213766 filed on Sep. 24, 2010, the contents of all of which are incorporated herein by reference in their entirety.

FIELD OF THE INVENTION

The present invention relates to a seat pad comprising a seat surface for seating configured to have at least a seat cover material thereon, a groove structure for containing a part of the seat cover material, the seat pad manufactured by foam molding in a mold with the seat surface maintained to face in a downward direction, the foam molding performed with an end of the seat surface, in terms of a longitudinal direction of the seat pad which crosses the horizontal direction thereof at right angle, positioned lower than the other end thereof. The present invention also relates to a method for manufacturing the seat pad.

DESCRIPTION OF THE RELATED ART

A seat such as that for an automobile or an indoor sofa generally comprises a seat pad made of synthetic resin foam such as flexible polyurethane foam or semi-rigid polyurethane foam, and a seat frame which supports the seat pad. The outer surface of the seat pad is covered with a seat cover material and attached to a seat frame.

The aesthetic property of a seat pad is improved by providing a groove on a seat surface, and including/inserting a part of the seat cover material in the groove (JP-A 2008-073441).

An embodiment of the seat pad and the manufacturing method thereof will be explained with reference to FIGS. 7a to 8c. FIGS. 7a to 8c show a back pad constituting a backrest of a seat, an example of a seat pad. FIG. 7a is a front view of a conventional seat pad (back pad) 101; FIG. 7b is a cross section of the seat pad of FIG. 7a along VIIB-VIIB line; and FIG. 7c is an enlarged view of FIG. 7b at part VIIC. FIG. 8a is a longitudinal cross section of a mold for foam molding (hereinafter, also abbreviated as a mold) 130 for forming the seat pad 101. FIGS. 8b and 8c are enlarged views of the mold of FIG. 8a at part VIIIB. More precisely, FIG. 8b shows the mold wherein polyurethane raw material is in the course of expansion, and FIG. 8c shows the mold wherein the expansion has been completed. The vertical (up-down), horizontal (left-right), and front and rear directions used for describing the mold structure correspond to those for a person on a seat made of the seat pad 101, respectively.

The seat pad 101 includes a seat pad main body 102 comprising a synthetic resin foam such as polyurethane foam, and an reinforcement member 120 made of a nonwoven fabric in the form of a plate provided on the rear face of the seat pad main body 102. The reinforcement member 120 is prepared to be integral with the seat pad main body 102 by integral molding. The seat pad 101 carries a seat cover material (not shown) on the frontal side (configured for sitting thereon), and is configured to be attached to the back frame (not shown) of the seat.

As shown in FIG. 7b, the seat pad main body 102 includes a main plate 103, and an extension 104 extending rearwardly from an upper end of the main plate 103, and an overhang 105 overhanging downwardly from a rear end of the extension 104. In other words, the extension 104 and the overhang 105 successively extend from the upper end of the main plate 103 with curving so as to go around to a rear side of the seat surface. The space surrounded by the main plate 103, extension 104 and the overhang 105 is formed as a depression 106 configured to engage with an upper end of the back frame. The depression 106 is prepared to be open downwardly.

A groove structure 107 is provided on the frontal side of the main plate 103 for containing a part of the seat cover material (i.e., the seat cover material is pulled in a thickness direction of the main plate 103 and introduced to the main plate along a line applied for design purpose). As shown in FIG. 7a, the groove structure 107 is composed of a horizontal groove 107a extending in a horizontal direction and vertical grooves 107b and 107c extending in a vertical direction. In this conventional example, the vertical grooves 107b and 107c are spaced apart, in a horizontal direction, from each other. The horizontal groove 107a is positioned between the above-mentioned vertical grooves 107b and 107c. The left and right ends of the horizontal groove communicate with the vertical grooves 107b and 107c on the way extending from the upper end to the lower end.

As shown in FIG. 7c, a wire 108 is embedded in the main plate 103 along the bottom surface of the groove structure 107. The wire 108 is provided for the engagement with an engagement tool such as a hook (not shown), which is provided on the back surface of the seat cover material. As shown in FIGS. 7a and 7c, a plurality of holes 109 are provided with being spaced apart from one another, for engagement operation. The engagement tools are provided on the back surface of the seat cover material at the positions corresponding to the holes 109. As shown in FIG. 7c, the wires 108 are exposed from the bottom surface of the holes 109.

The mold 130 for forming the seat pad main body 102 by foam molding comprises a lid 131, a bowl 132, and a tongue 133 attached to the lid 131. The seat pad main body 102 is formed in the mold 130 in accordance with foam molding, with the front surface facing in a lower direction. In other words, the front surface of the seat pad main body 102 is formed by the cavity bottom surface determined by the bowl 132, and the back surface of the seat pad main body 102 is formed by the cavity surfaces determined by the lid 131 an the tongue 133. The detailed structure of the mold 130 will now be explained with the directions for the parts of the mold 130 corresponding to the vertical (up-down), horizontal (left-right), front and rear directions for the seat pad main body 102. From the upper end of the tongue 133 (left side of FIG. 8a), a projection 134 for forming the depression 106 is projected. The main plate 103 of the seat pad main body 102 is formed in the cavity space 135 determined by the cavity bottom surface of the bowl 132 and the front surfaces of the tongue 133. The extension 104 is formed in the cavity space 136 determined by an free end of the projection and a cavity lateral side of the bowl 132. Moreover, the overhang 105 is formed in the cavity space 137 determined by a rear surface of the projection 134 and a cavity ceiling surface of the lid 131.

FIG. 8a is a prior art example wherein the seat pad main body 102 has an extension 104 and the overhang 105 successively extending from the upper end of the main plate 103 with curving so as to go around to a rear side of the seat surface. In this case, the cavity bottom surface of the bowl 132 is inclined so as to have the upper end of the main plate 103 (left side in FIG. 8a) is positioned lower than the lower end of the main plate 103. Polyurethane raw material is introduced to the mold 130 in the above-described condition from the lower end of the main plate 103 (i.e., from the upper side of the inclined cavity bottom surface).

By the above configuration, the polyurethane raw material poured to the mold 130 flows down toward the upper end of the main plate 103 (i.e., an lower side of the inclined cavity bottom surface) which will be formed on the cavity bottom surface. Therefore, the polyurethane expanded in the cavity space 135 easily goes around from the upper end of the seat pad main body 102 to the cavity spaces 136 and 137. Further, it is possible to prevent the lower end of the seat pad main body 102, from having underfill because of insufficient urethane supply.

On the cavity bottom surface of the bowl 132, a groove-formation protrusion 138 is provided, for preparing the groove structure 107. A part of the groove-formation protrusion 138, which corresponding to the horizontal groove 17a, extends on the cavity bottom surface in the horizontal direction. A plurality of hole-formation risings 140 for preparing holes 109 projects from the upper end of the groove-formation protrusion 138. A magnet 140 is embedded in the upper end of the hole-preparation rising 140, for engagement with the wire 108.

For manufacturing the seat pad 101 by using the mold 130, the lid 131 and the bowl 132 are firstly separated from each other to open the mold, and then the reinforcement member 120 is applied to the tongue 133. The wire 108 is arranged so as to extend over top ends of the hole-formation risings 140, and absorbed by the magnets 141 provided thereon. Subsequently, a polyurethane raw material is poured to the mold 130. Herein, the polyurethane raw material is applied to the left and right sides of the cavity bottom surface of the bowl 132 and the lower end of the main plate 103 (i.e., an upper side of the inclined cavity bottom surface). Accordingly, the polyurethane raw material applied to the upper side of the inclined cavity bottom surface flows down to the lower side thereof. Hence, the polyurethane raw material is uniformly delivered to the entire the cavity bottom surface. The polyurethane raw material, in the course of flowing down the inclined cavity bottom surface, overpasses the groove-formation protrusion 138, which horizontally extends on the cavity bottom surface. Then, the polyurethane raw material expands to fill the cavity spaces 135, 135, and 137, successively in this order. Accordingly, the main plate 103, the extension 104 and the overhang 105 are made integral with one another. Simultaneously, the reinforcement member 120 is formed to be integral with the back surface of the main plate 103. After curing the polyurethane foam, the lid 131 and the bowl 132 are separated from each other to open the mold. In this way, the seat pad main body 102 is released from the mold. Thereafter, the finishing operation such as deflashing is carried out for completing the preparation of the seat pad 101.

PRIOR ART LITERATURE

Patent Literature 1: JP-A 2008-073441

SUMMARY OF THE INVENTION

Problem to be Solved by the Invention

In the foam molding step of the seat pad 101 shown in FIG. 8b, the polyurethane raw material poured to the mold 130 flows down along the inclined cavity bottom surface by overpassing the groove-formation protrusion 138 toward the lower part of the cavity. In the course of flowing, it is possible that polyurethane raw material flows to the lower part without sufficiently filling the lower side of the groove-formation protrusion 138. As described in FIG. 8c, it is possible that underfill/mold failure such as formation of void B occurs, at a position corresponding to an upper part of the thus formed seat pad 101.

It is an object of the present invention to provide a seat pad which does not have the above discussed underfill at the circumference of the horizontal groove, and a method for manufacturing the same.

Means for Solving the Problems

A seat pad in a first embodiment is made of foam molded body, comprising:

a seat surface for seating configured to have at least a seat cover material thereon;

a groove structure for containing a part of the seat cover material at least a part of the groove structure being formed as a horizontal groove which extends in a horizontal direction on the seat surface, the seat pad manufactured by foam molding in a mold with the seat surface maintained to face in a downward direction, the foam molding performed with a first end of the seat surface, in terms of a longitudinal direction of the seat pad which crosses the horizontal direction thereof at right angle, positioned lower than a second end thereof; and at least one concavity positioned between the first end and the horizontal groove, and facing the horizontal groove.

In the seat pad in the second embodiment, the at least one concavity in the seat pad of the first embodiment is in the form of a groove extending parallel to the horizontal groove.

In the seat pad in the third embodiment, the at least one concavity in the seat pad of the first or the second embodiment is prepared as a plurality of concavities spaced apart from one another and successively arranged in the longitudinal direction of the horizontal groove.

In the seat pad in the fourth embodiment, the seat pad in any of the first to the third embodiments further comprising an engagement member embedded in the groove structure along the bottom surface thereof, an engagement tool provided on the seat cover material, the engagement member configured to engage with the engagement tool, and at least one hole for engaging the engagement member with the engagement tool provided on the bottom surface of the groove structure, the at least one concavity is provided so as to face the at least one hole.

In the seat pad in a fifth embodiment, the seat pad in any of the first to the fourth embodiments is a back pad having an upper end, and a curved structure extending from the upper end and curving so as to go around to an opposite side of the seat surface, the back pad manufactured in accordance with foam molding in a mold, with an upper end of the seat surface positioned lower than the lower end thereof in the mold, the concavity positioned between the upper end of the seat surface and the horizontal groove on the seat surface.

A method as a sixth embodiment is for manufacturing a seat pad in any of the first to fifth embodiments by using a mold for foam molding, wherein the mold being structured for molding the seat pad with the seat surface facing in a downward direction, the mold having a cavity bottom surface inclined so that the first end of the seat surface is positioned lower than the second end thereof, the cavity bottom surface comprising:

a protrusion for forming the groove, at least a part of the protrusion extending in a horizontal direction when the seat pad is viewed in a position for use, and a convexity for forming the concavity, the concavity positioned between the first end and the horizontally elongated protrusion, and facing the horizontally elongated protrusion.

In the method for manufacturing the seat pad as a seventh embodiment, the height of the convexity measured from the cavity bottom surface is less than that of the elongated protrusion measured therefrom, in the method of the sixth embodiment.

Effect of Invention

A concavity is provided on a seat surface configured for sitting thereon in the seat pad of the present invention. The concavity is positioned in a mold for preparing the seat pad between the groove and a first end of a cavity bottom surface, which is positioned lower than the groove, facing the groove. By the provision of the concavity, polyurethane raw material poured to the mold overpasses the horizontal groove on the way flowing down, a part of the materials remains on the lower side of the horizontal groove by the interruption by the concavity. The polyurethane raw material foams/expands, and air is expelled from the corners around the horizontal groove, and hence the lower side of the horizontal groove (a part behind the horizontal groove) is sufficiently filled with polyurethane foam. As a result, it is possible to prevent the molded seat pad from having molding failure such as void formation at the periphery of the horizontal groove.

In the seat pad in the second embodiment, it is preferable that the at least one concavity in the seat pad is in the form of a groove extending parallel to the horizontal groove. Based on this structure, the concavity 10 gives no or little affects (mark) to the seat cover material (such depression of seat cover material to the concavity 10).

In the seat pad in the third embodiment, it is possible that the at least one concavity is prepared as a plurality of concavities spaced apart from one another and successively arranged in the longitudinal direction of the horizontal groove. Based on this structure, molding failure at the periphery of the horizontal groove can be avoided even when the horizontal groove is long.

The seat pad may have at least one hole in the bottom of the groove structure, the hole configured to engage with the engagement tool. Since the depth of the hole is greater than the groove structure, polyurethane raw material cannot easily delivered to a lower part of the hole at the seat pad foam molding. For such reason, it is preferable that the concavity is provided so as to face the hole. Based on this structure, a lower part in the hole is sufficiently filled with expanded polyurethane.

In the fifth embodiment, the present invention is preferably applicable to the back pad having an upper end, and a curved structure extending from the upper end and curving so as to go around to an opposite side of the seat surface. This back pad is manufactured by foam molding in a mold, with the upper end of the seat surface positioned lower than the lower end thereof in the mold. Accordingly, the molding failure at the periphery of the horizontal groove can be avoided by providing the concavity between the upper end of the seat surface and the horizontal groove on the seat surface.

In method for manufacturing the seat pad as the sixth embodiment, the mold has a cavity bottom surface comprising a horizontally elongated protrusion for forming the horizontal groove, and a convexity for forming the concavity, the concavity positioned between the first end and the horizontally elongated protrusion. Therefore, the polyurethane raw material poured into the mold 30 overpasses the horizontally elongated protrusion on the way of flowing down on the cavity bottom surface, and the polyurethane raw material is partially prevented from flowing by the convexity and retained at the lower side of the horizontally elongated protrusion. Therefore, the lower part of the horizontally elongated protrusion is adequately filled with polyurethane foam. Accordingly, it is possible to avoid molding failure such as voids at the periphery of the horizontal groove of the completed seat pad main body. Namely, the seat pads having high quality can be manufactured with good yield.

In the seventh embodiment, the height of the convexity is prepared to be less than that of the elongated protrusion. Accordingly, the polyurethane raw material which overpass the horizontally elongated protrusion is not excessively prevented from further flowing even by the provision of the convexity, and relatively easily overpasses the convexity 39 to flow to the lower side of the inclined cavity bottom surface. The polyurethane raw material is delivered sufficiently also to the lower side of the inclined cavity bottom surface.

BRIEF DESCRIPTION OF THE DRAWINGS

FIG. 1b is a cross section of the seat pad along IB-IB line in FIG. 1a.

FIG. 1d is a cross section of the seat pad along ID-ID line in FIG. 1a.

FIG. 2b is an enlarged view of part IIB in FIG. 2a

FIG. 5b is a cross section along VB-VB line in FIG. 5a.

FIG. 6b is a cross section along VIB-VIB line in FIG. 6a.

FIG. 7b is a cross section of the seat pad along VIIB-VIIB line in FIG. 7a.

EMBODIMENTS FOR CARRYING OUT THE INVENTION

The embodiments of the present invention will now be explained below, with referring to the figures. In the embodiments, a back pad constituting a backrest for a vehicle seat as a seat pad, and a method for manufacturing the same are described. In addition to this, the present invention is applicable to a cushion pad constituting a seat for a vehicle seat. Moreover, the present invention is also applicable to a seat pad constituting various seats except for vehicle seats, and methods for manufacturing the same.

First Embodiment

Figure 1A:
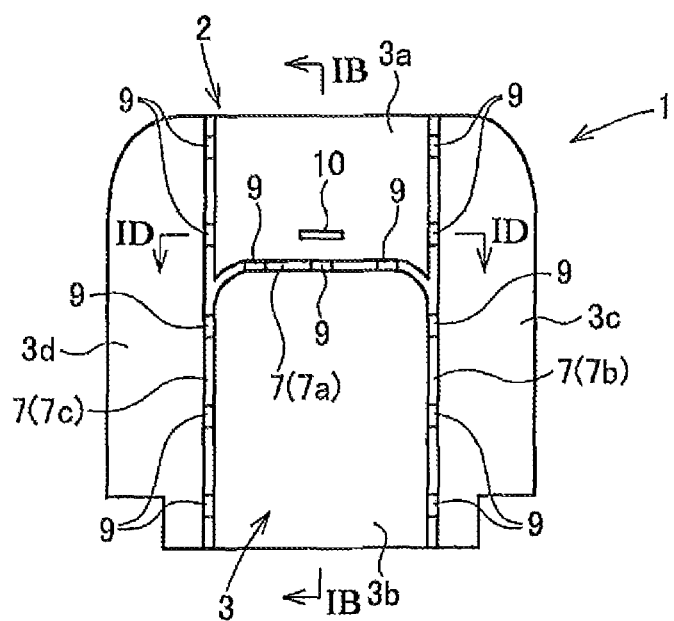
FIG. 1a is a front view of a seat pad as a first embodiment.
Figure 1B:
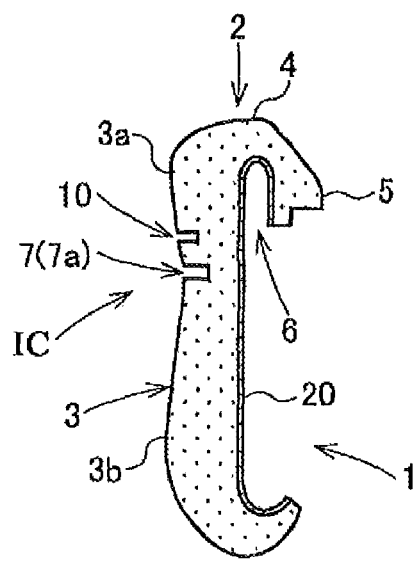
Figure 1C:
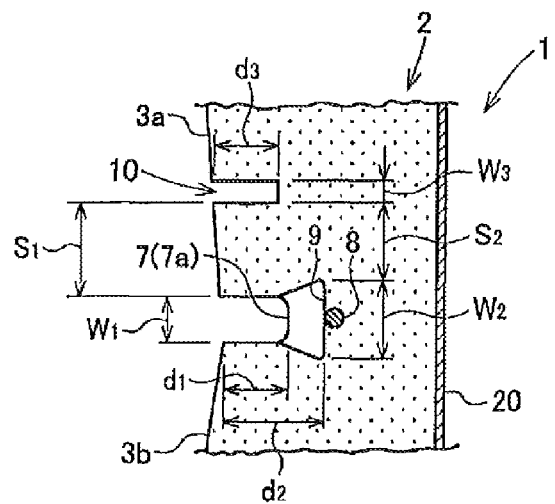
FIG. 1c is an enlarged view of part IC in FIG. 1b.
Figure 1D:
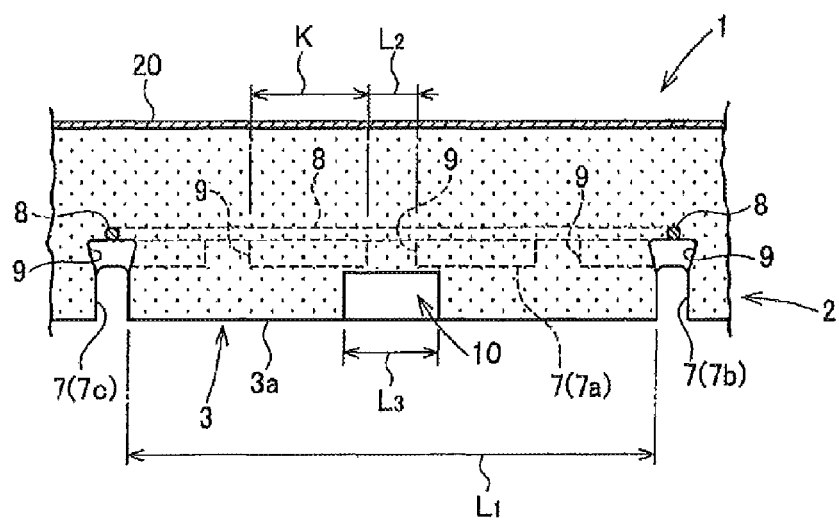
Figure 2A:
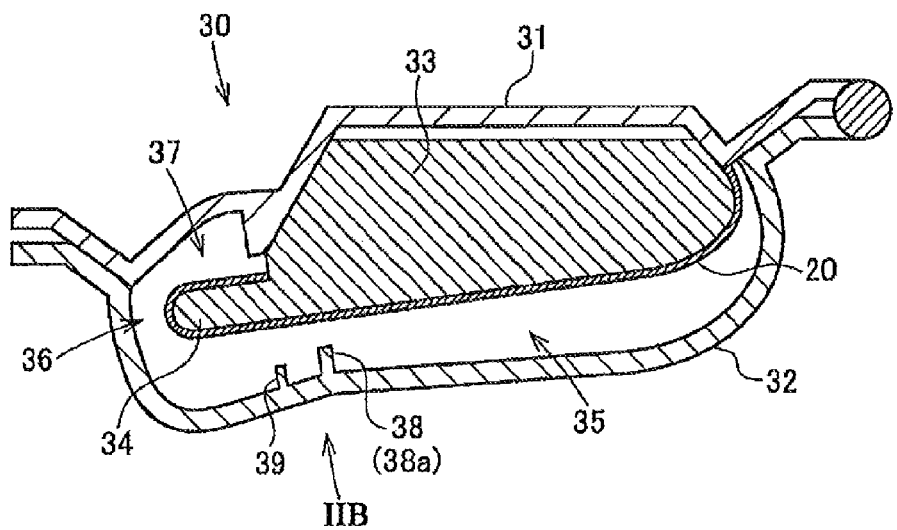
FIG. 2a is a longitudinal cross section of a mold for foam molding for forming a seat pad of FIGS. 1a to 1d.
Figure 2B:
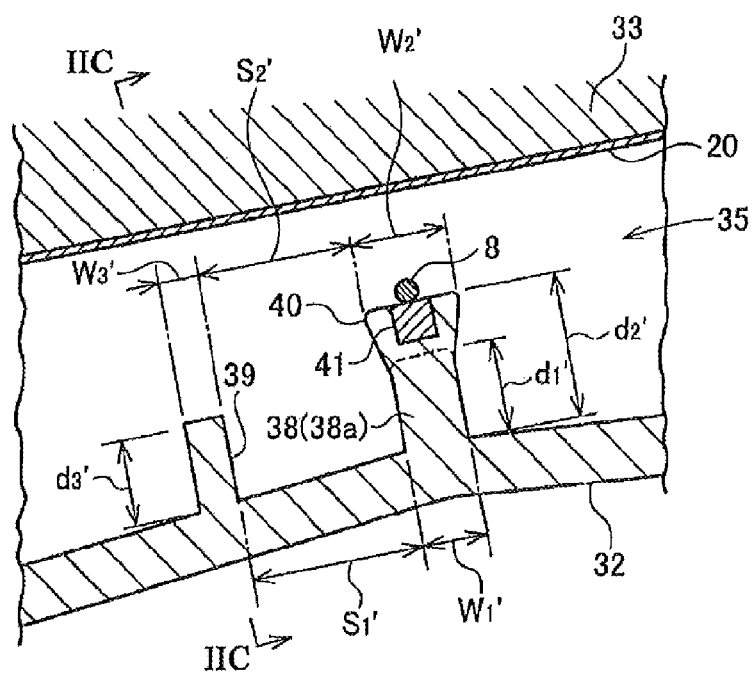
Figure 2C:
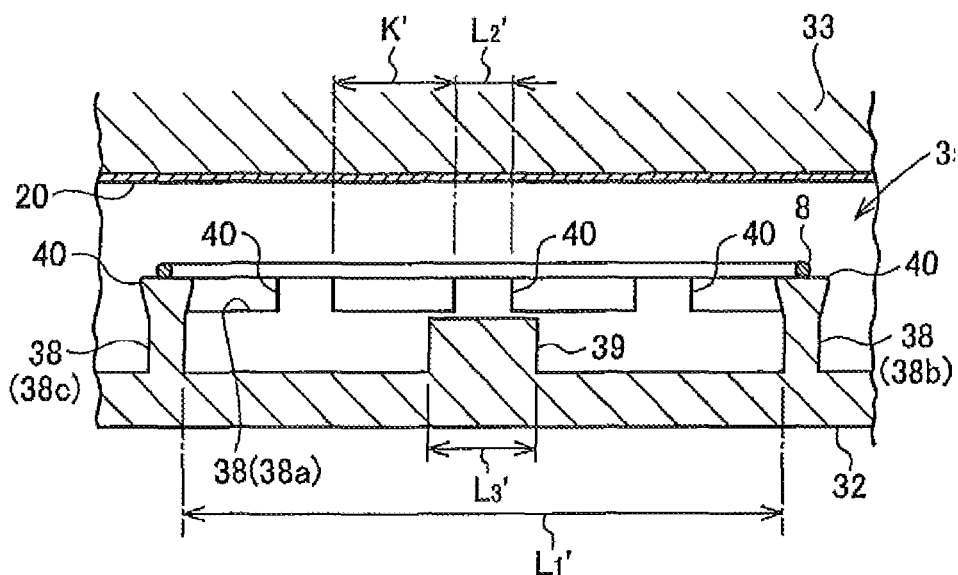
FIG. 2c is a cross section of the mold along IIC-IIC line in FIG. 2b.
Figure 3A:
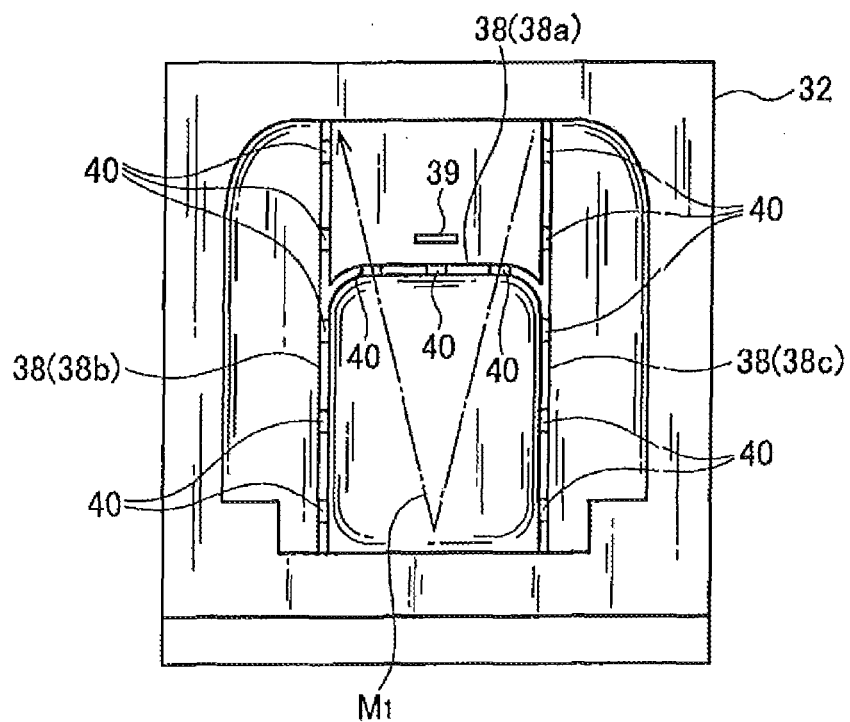
FIG. 3a is a plan view of a bowl for explaining a route for moving a nozzle for pouring a polyurethane raw material to the mold shown in FIGS. 2a to 2c.
Figure 3B:
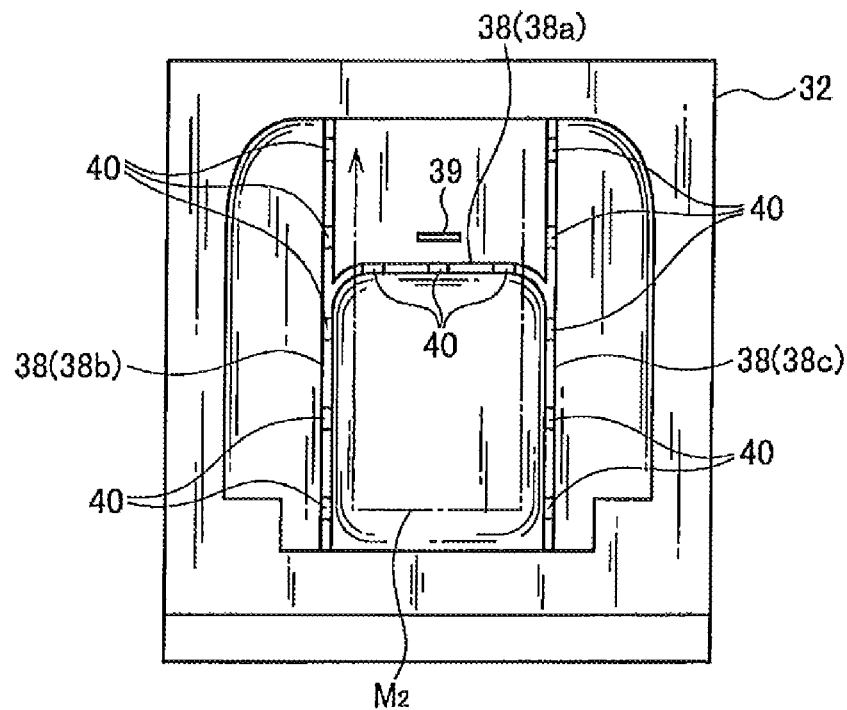
FIG. 3b is a plan view of a bowl for explaining a route for moving a nozzle for pouring a polyurethane raw material to the mold shown in FIGS. 2a to 2c.
Figure 4A:
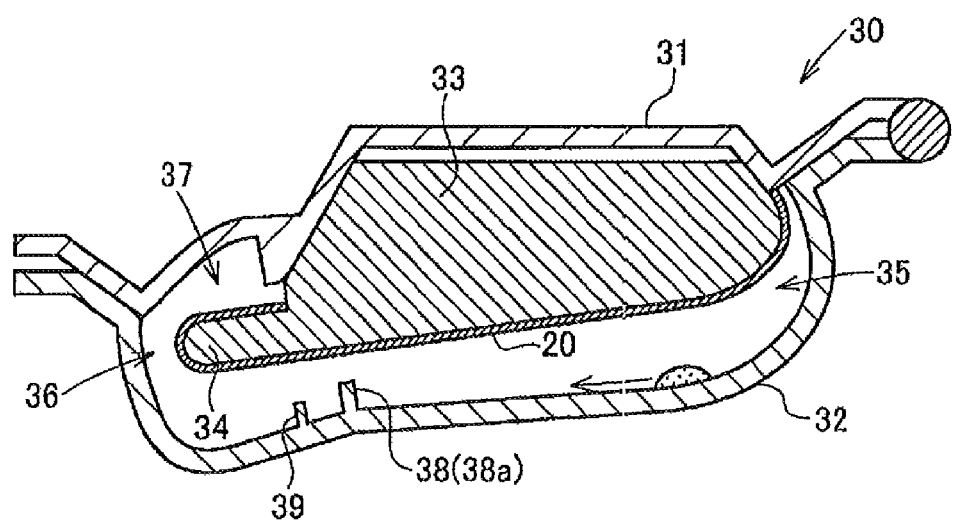
FIG. 4a is a cross section of a mold at the part as shown in FIG. 2a, for explaining a seat pad immediately after pouring polyurethane raw material to the mold in an foam molding step.
Figure 4B:
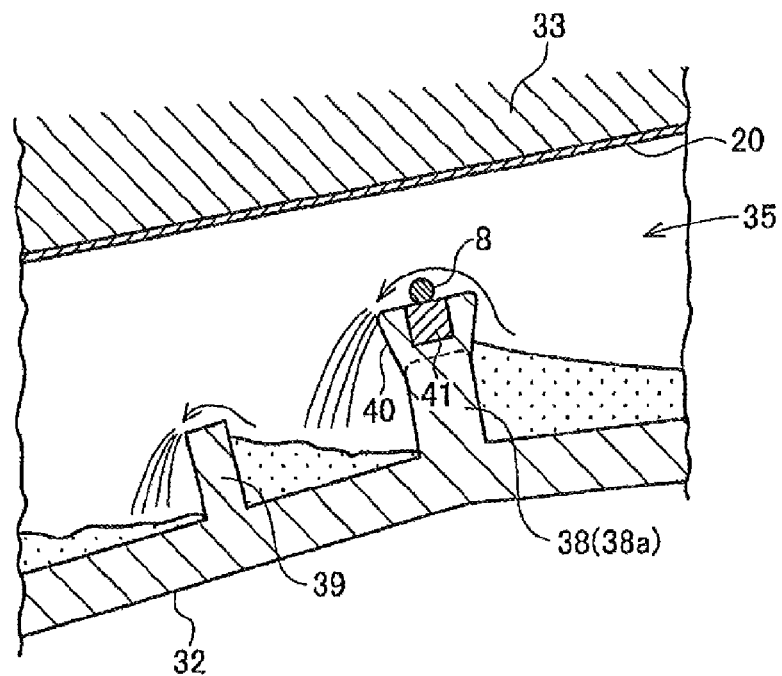
FIG. 4b is a cross section of a mold at the part as shown in FIG. 2b, for explaining a seat pad in the course of expanding polyurethane raw material in the mold in an foam molding step.
Figure 4C:
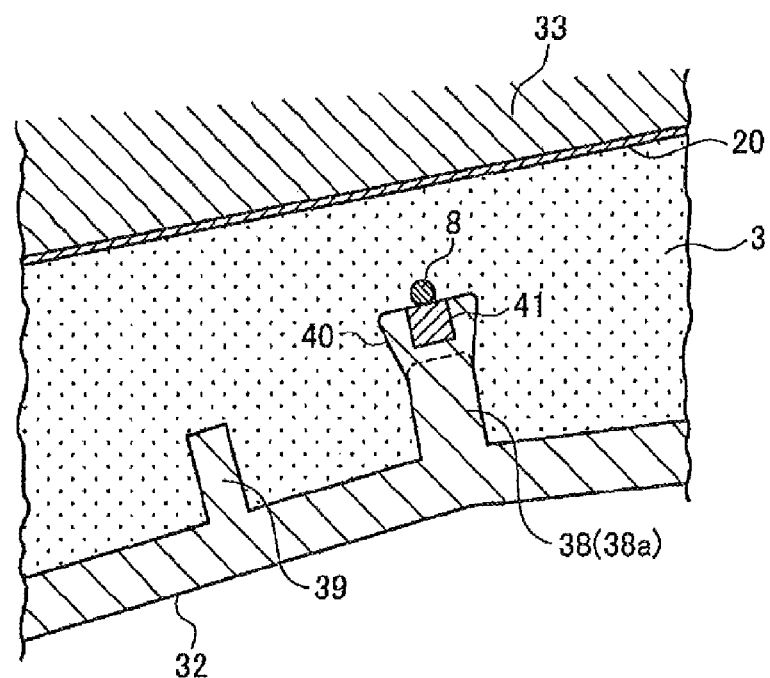
FIG. 4c is a cross section of a mold at the part as shown in FIG. 2b, for explaining the seat pad after completion of expansion in an foam molding step.

FIG. 1a is a front view of a seat pad according to a first embodiment; FIG. 1b is a cross section of the seat pad along IB-IB line in FIG. 1a; FIG. 1c is an enlarged view of part IC in FIG. 1b; and FIG. 1d is a cross section of the seat pad along ID-ID line in FIG. 1a. FIG. 2a is a longitudinal cross section of a mold for foam molding for forming the seat pad; FIG. 2b is an enlarged view of part IIB in FIG. 2a; and FIG. 2c is a cross section of the mold along IC-IC line in FIG. 2b. Each of FIGS. 3a and 3b is a plan view of a bowl for explaining a route for moving a nozzle for pouring polyurethane raw material to the mold. FIGS. 4a to 4c are diagrams for explaining an foam molding step for forming a seat pad; i.e., FIG. 4a is a cross section of a mold for explaining the mold immediately after pouring polyurethane raw material; FIG. 4b is a cross section of a mold for explaining polyurethane raw material in the course of expanding; and FIG. 4c is a cross section of a mold for after expansion being completed. Herein, FIG. 4a is a cross section at the same part as in FIG. 2a; each FIGS. 4b and 4c is a cross section at the same part as in FIG. 2b. In the following explanation, the vertical direction (up-down), horizontal (left-right) direction, and front-rear direction correspond to those for a person on the seat prepared by use of the seat pad.

In the present embodiment, a seat pad 1 is a back pad constituting a back rest of a vehicle seat. The seat pad 1 comprises a seat pad main body 2 comprising a synthetic resin foam such as polyurethane foam, and an reinforcement member 20 in the form of a plate provided on the back surface (opposite surface with respect to the seat surface configured for seating thereon). The reinforcement member 20 is prepared to be integral with the seat pad main body 2 by integral molding. As the material for constituting the reinforcement member 20, non-woven fabrics are preferably used. It is also possible to use materials other than non-woven fabrics (such as felt, or woven or knitted fabrics). The reinforcement member 20 may be omitted. The structure of a mold 30 used for foam molding of the seat pad main body 2, and the manufacturing method of the seat pad 1 by using the mold 30 will be explained in detail. At least the frontal surface (seat surface configured for seating) of the seat pad 1 is covered with a seat cover material (not shown). The seat pad 1 is designed to be attached to a back frame (not shown) of a seat.

As shown in FIGS. 1a and 1b, the seat pad main body 2 includes a main plate 3 (with which, the front surface of the back frame is covered), an extension 4 extending rearwardly from a rear face-upper end of the main plate 3, and an overhang 5 overhanging downwardly from a rear end of the extension 4. The main plate 3, the extension 4, and the overhang 5 are formed integral with one another. A part surrounded by the main plate 3, extension 4 and the overhang 5 forms a depression 6 configured to engage with an upper end of the back frame. The depression 6 is prepared to be open downwardly. In this embodiment, the extension 4 and the overhang 5 constitute a curved structure extending with curving from the upper end of the main plate 3 to the rear face side of the main plate 3. The structure of in the seat pad 2 is not limited to the above discussed embodiment.

In this embodiment, as shown in FIG. 1a, the main plate 3 comprises an upper back part 3a configured to contact with a upper back portion of a person, a lower back part 3b configured to contact with a lower back portion, and side support parts 3c and 3d provided on the right and left sides for the upper back part 3a and the lower back part 3b. The side support parts 3c and 3d are configured to extend from the upper end of the upper back part 3a to the lower end of the lower back part 3b. In this embodiment, the upper back part 3a, the lower back part 3b, and the side support parts 3c and 3d can be prepared from the same polyurethane raw material, or different polyurethane raw materials.

A groove structure 7 is provided on the frontal side of the main plate 3 for including a part of the seat cover material (i.e., the seat cover material is pulled in a thickness direction of the main plate 3 and introduced the seat cover material into the main plate along a line applied for design purpose). In this embodiment, the groove structure 7 is composed of a horizontal groove 107a extending in a horizontal direction along a boundary between the upper back part 3a and the lower back part 3b, and vertical grooves 7b and 7c extending in a vertical direction along a boundaries between a section including the upper back part 3a and the lower back part 3b and a side support part 3c or 3d. The vertical grooves 7b and 7c extend from the upper edge of the main plate 3 to the lower edge thereof. The left and the right ends of the horizontal groove 7a respectively communicate with the vertical grooves 7b and 7c in the middle of the grooves 7b and 7c. The arrangement of the groove structure 7 is not limited to this embodiment. A wire 8 is embedded in the main plate 3 along the bottom surface of the groove structure 7 (7a to 7c), which is for engaging with an engagement tool (not shown) such as a hook attached to the back surface of the seat cover material. Here, the engagement member, which is used for the engagement with the engagement tool, is not limited to the wire. It is possible to use, for instance, a plate having a hole configured to engage with the engagement tool, or other various structures.

As described in FIGS. 1a, 1c and 1d, a plurality of holes 9 for engaging with the engagement tools is provided on the bottom surface of the groove structure 7. The holes, which are for engagement operation with the engagement tools, are arranged in the groove so as to be spaced apart from each other. On the back surface of the seat cover material, engagement tools in the same number with the holes 9 are provided at positions corresponding to the holes 9. As shown in FIG. 1c, the wires 8 are exposed from the bottom of the holes 9. (Alternatively, the wires 8 are embedded in the main plate in the depth so that the wires can see through the bottom surfaces of the holes.) In this embodiment, as shown in FIGS. 1c and 1d, the hole 9 has a cross section in a direction which crosses the longitudinal direction of the grooves 7 (7a, 7b or 7c) at right angle, the width of the hole, which runs in a direction crossing a depth direction thereof at right angle, (hereinafter, simply referred to as width) is gradually increased toward the rear side of the hole (i.e., the closer to bottom of the hole in the main plate 3, the large the width).

In general, the depth $d_1$ of the groove structure 7 from the front surface of the main plate 3 is in the range of 15 to 60 mm, preferably in the range of about 40 to 50 mm, and the width $W_1$ is in the range of 5 to 15 mm, preferably in the range of about 8 to 12 mm. The depth $d_2$ of the groove structure 7 from the front surface of the main plate 3 is in the range of 20 to 65 mm, preferably in the range of about 45 to 55 mm, and the length $L_1$ in the horizontal direction (i.e., a distance between the vertical grooves 7b and 7c) is in the range of 300 to 600 mm, preferably in the range of about 400 to 500 mm. The largest width $W_2$ of the hole 9 (the width in the bottom of the hole 9) is in the range of 10 to 30 mm, preferably in the range of about 15 to 20 mm. The mouth of the hole 9 has a width which is as large as or different from the width $d_2$ of the groove structure 7. Each of the holes 9 has a length $L_2$ in the longitudinal direction of the groove structure 7 in the range of 20 to 80 mm, preferably in the range of about 30 to 50 mm. The distance K between two adjacent holes 9 in the single groove 7a, 7b or 7c is in the range of 50 to 200 mm, in particular in the range of about 100 to 150 mm.

In this embodiment, a concavity 10 is prepared by the front surface of the upper back part 3a being concaved in an inner direction, i.e., a thickness direction of the main plate 3. Moreover, the concavity 10 is provided on the upper part of the horizontal groove 7a so as to be located adjacent to or face the horizontal groove 7a. In the present embodiment, the concavity 10 is in the form of a horizontally extending groove. Moreover, in this embodiment, a single concavity 10 is provided approximately in the center of the horizontal groove 7a with respect to the longitudinal direction of the horizontal groove 7a.

It is preferable that the concavity 10 is prepared so as to face the hole 9 provided in the horizontal groove 7a. In this embodiment, as shown in FIG. 1a, three holes 9 are provided with being spaced apart from each other in the longitudinal direction of the groove. The concavity 10 is positioned to face the hole 9 at the center of the holes with respect to the longitudinal direction of the horizontal groove 7a. The number of the concavity 10 and the arrangement thereof are not limited to the above. For example, the concavity 10 can be provided so as to face the hole other than the hole 9 at the center of the holes with respect to the longitudinal direction of the horizontal groove 7a.

The length $L_3$ of the concavity 10 in the horizontal direction is in the range of 5 to 25%, preferably in the range of about 10 to 15% of the length $L_1$ of the horizontal groove, and particularly about 50 mm. It is preferable that the concavity 10 does not communicate with the vertical grooves 7b and 7c. Such no connection is preferred for avoiding defect generation at the crossings of the horizontal groove 7a with the vertical grooves 7b and 7c The depth $d_3$ of the concavity 10 measured from the front surface of the upper back part 3a is preferably less than the depth $d_2$ of the aforementioned holes 9, more preferably less than the depth $d_1$ of the groove structure 7. Specifically, the depth $d_3$ of the concavity 10 is preferably in the range of 10 to 60 mm, more preferably in the range of about 20 to 40 mm. The weigh $W_3$ of the concavity 10 in a vertical direction is in the range of 2 to 10 mm, and particularly about 3 mm. When the width $W_3$ is too small, the pad tends to be easily torn when the pad is released from the mold. While when the width $W_3$ is too large, the concavity 10 is easily reflected to the seat cover material (for instance as a depression of the seat cover material to the concavity 10).

The distance between the concavity 10 and the horizontal groove 7a (i.e., a distance therebetween in a direction which crosses the depth direction of the concavity 10 at right angle. Herein after, the same definition is used). It is preferable that $S_1$ is in the range of about 20 to 80 mm, and more preferably in the range of about 40 to 60 mm. When the distance $S_1$ is too small, the pad tends to be easily torn when the pad is released from the mold. While when the distance $S_1$ is too large, the effect of the invention could not be obtained sufficiently.

In the present embodiment, the width of the hole 9 gradually increases towards the bottom of the hole. Therefore, as shown in FIG. 1c, the portion between the concavity 10 and the center hole 9, which is located center of the holes arranged in the longitudinal direction of the horizontal groove 7a, has an undercut shape. The distance $S_2$ between the highest part of the center hole 9 (a part adjacent to the upper end of the bottom of the hole 9) and the concavity 10 is preferably in the range of 30 to 80 mm, more preferably in the range of about 50 to 70 mm. Such configuration makes it possible, when the pad is taken out of the mold, to relatively easily extract the undercut structure formed between the concavity 10 and the hole 9 from the portion between an elongated protrusion 38a and a convexity 39 in the mold.

A mold 30 for forming the seat pad main body 2 will now be explained.

As shown in FIG. 2a, the mold 30 comprises a lid 31, a bowl 32, and a tongue 33 set in the lid 31, in this embodiment. The seat pad main body 2 is expanded by foam molding with the front surface facing downwardly in the mold 30. In other words, the front surface of the seat pad main body 2 is prepared along a cavity bottom surface of the bowl 32, and the rear surface thereof is prepared along the cavity ceiling surfaces of the lid 31 and the tongue 33. The structure of the mold 30 will be explained below by describing the direction of the parts thereof so as to correspond to the vertical, horizontal, and front to rear directions of the seat pad main body 2. From the upper end of the tongue 33 (left end in FIG. 2a), a projection 34 is projected, which is for forming the previously mentioned depression 6. The main plate 3 of the seat pad main body 2 is prepared in the cavity space 35 determined by the cavity bottom surface of the bowl 32 and the front surface of the tongue 33. The extension 4 is formed in the cavity space 36 determined by a free end of the projection 34 and a cavity lateral side of the bowl 32. Moreover, the overhang 5 is formed in the cavity space 37 determined by a rear surface of the projection 34 and a cavity ceiling surface of the lid 31.

FIG. 2a shows that the cavity bottom surface of the bowl 32 is so inclined that the upper end of the seat pad main body 2 (left side in FIG. 2a) is prepared at a position lower than the lower end thereof. By the above configuration, the polyurethane raw material poured to the mold 30 flows down toward the upper end of the seat pad main body 2 to be formed on the cavity bottom surface (i.e., a lower side of the inclined cavity bottom surface). Therefore, the polyurethane expanded in the cavity space 35 is easily brought from the upper end of the seat pad main body 2 to the cavity spaces 36 and 37.

On the cavity bottom surface of the bowl 32, a groove-formation elongated protrusion 38 for preparing the groove structure 7, and a concavity-formation convexity 39 for forming the concavity 10 are provided. The groove-formation elongated protrusion 38 includes a horizontally elongated protrusion 38 for preparing the horizontal groove 7a and vertical protrusions 38b and 38c for preparing the vertical grooves 7b and 7c. The outer counter of the elongated protrusion 38 is in conformity with the inner counter of the groove structure 7. A plurality of hole-formation risings 40 for preparing the holes 9 projects from the top end of the elongated protrusion 38. These risings 40 are arranged with spaced apart from one another in an extending direction of the elongated protrusion 38 so as to correspond to the arrangement of holes. The outer counter of the risings 40 is in conformity with the inner counter of the holes 9. In other words, in the embodiment as shown in FIG. 2b, the risings 40 have such a shape that the width/length in a direction crossing the longitudinal direction of the elongated protrusion 38 increases toward the upper end of the risings 40. A magnet 41 is embedded in the upper end of the rising 40, for engaging with the wire 8. The engagement of the wire 8 with the bowl 32 is not limited to this embodiment.

In this embodiment, the convexity 39 has walls extending approximately parallel to the horizontally elongated protrusion 38a. In the present embodiment, the convexity 39 is provided to face the center of the horizontally elongated protrusion 38a with respect to the longitudinal direction thereof, preferably to face the rising 40 projected at the center thereof.

The height $d_1$ of the elongated protrusion 38 from the cavity bottom surface and the preferable range are substantially the same as the previously mentioned depth $d_1$ of the groove structure 7. The thickness $W_1'$ of the elongated protrusion 38 in a direction crossing both longitudinal direction and height (hereinafter, simply referred to as thickness) and the preferable range are substantially the same as the previously mentioned width $W_1$ for the groove structure 7.

The length $L_1'$ of the elongated protrusion 38a in the horizontal direction (i.e., a distance between the vertical protrusions 38b and 38c) and the preferable range are substantially the same as the length $L_1$ of the previously mentioned horizontal groove 7a.

The height $d_2'$ of the rising 40 from the cavity bottom wall to the top of the rising 40 and the preferable range are substantially the same as the depth $d_2$ of the previously mentioned hole 9. The largest thickness $W_2'$ at the upper end of the rising 40 and the preferable range thereof are substantially the largest width $W_2$ for the hole 9. The length $L_2'$ of the rising 40 in the longitudinal direction of the elongated groove 38 and the preferable range thereof are substantially the same as the length $L_2$ of the hole 9. The distance K' between the adjacent risings 40 and 40 in the elongated grooves 38a, 38d and 38c and the preferable range thereof are substantially the same as the distance K between the adjacent holes 9 and 9.

The height $d_3'$ of the convexity 39 from the cavity bottom surface and the preferable range are substantially the same as the depth $d_3$ of the concavity 10. The thickness $W_3'$ of the convexity 39 and the preferable range thereof are substantially the same as the width $W_3$ of the concavity 10. The length $L_1'$ of the convexity 39 in the horizontal direction and the preferable range thereof are substantially the same as the length $L_1$ of the concavity 10. The distance $S_1'$ between the convexity 39 and the horizontally elongated protrusion 38a and the distance $S_2'$ between the convexity 39 and the rising 40 at the middle with respect to the longitudinal direction of the horizontally elongated protrusion 38a, and the preferable ranges of these are substantially the same as the distance $S_1$ between the horizontal groove 7a and the concavity 10, and the distance $S_2$ between the center hole 9 in the middle with respect to the longitudinal direction of the horizontal groove 7a and the concavity 10.

For manufacturing the seat pad 1 by using the mold 30, the lid 31 and the bowl 32 are separated from each other to open the mold, and a reinforcement member 20 is applied to the tongue 33. The wire 8 is arranged so as to extend over top ends of the hole-formation risings 40, and the absorbed by the magnets 41 provided on the upper end of the hole-formation risings 40. Subsequently, the polyurethane raw material is discharged from a nozzle for pouring the polyurethane raw material (not shown) to the cavity bottom surface of the bowl 32. Thus, the mold 30 is charged with the polyurethane raw material.

FIGS. 3a and 3b describe a general route for moving the nozzle for discharging the polyurethane raw materials when the polyurethane raw material is discharged as discussed above. FIG. 3a shows that a V-shaped moving route $M_1$ of the discharge nozzle. Therein, the nozzle moves from the lower end of the inclined cavity bottom surface (i.e., upper side of the seat pad main body 2) on the left side or right side (right side in FIG. 3a), to the upper end thereof (i.e., lower end of the seat pad man body 2) approximately at the middle in a horizontal direction of the seat pad. Further, the nozzle moves to an opposite side with respect to the discharge start point (left side in FIG. 3a). Moreover, FIG. 3b also describes another moving route $M_2$ of the discharge nozzle, wherein the nozzle is moved in the U shape. In this case, the nozzle moves from the lower end of the inclined cavity bottom surface to the upper end thereof on the left side or right side (right side in FIG. 3b), and then turns to the opposite side (left side in FIG. 3b). Thereafter, the nozzle moves to the lower end of the inclined cavity bottom along the same side. In the present invention, it is possible to move the discharge nozzle in a route other than those described in the figure. However, it is preferable to move the discharge nozzle along either of the movement route $M_1$ or $M_2$. FIG. 4a shows the mold immediately after discharging the polyurethane raw material.

According to the discharge method as discussed above, it is difficult to have defects at the crossings of the horizontal groove 7a with the vertical grooves 7b and 7c, especially at the corners on the upper side, with respect to the crossing, although seat pads generally tends to have defects on these parts. Especially when the seat pad has a design where the ends of the horizontal groove 7a are downwardly curved to communicate with the vertical grooves 7b and 7c at the crossing, as in the present embodiment, the above-mentioned discharge method is particularly preferable.

Moreover, the concavity 10, which is not integral with the vertical grooves 7b and 7c, helps to decrease tearing or defect generated on the product when released from the mold.

The polyurethane raw material discharged to the upper end of the inclined cavity bottom surface gradually flows down to the lower end of thereof with expanding, as shown in FIG. 4b. On the way to the lower end, the polyurethane raw material overpasses the horizontally elongated protrusion 38a. In the present embodiment, the convexity 39a is provided on the lower side inclined cavity bottom surface with respect to the horizontally elongated protrusion 38a so as to face the horizontally elongated protrusion 38a. As shown in FIG. 4b, the polyurethane raw material is partially prevented from flowing by the convexity 39 and retained at the lower side of the horizontally elongated protrusion 38a. The reminder of the polyurethane raw material overpasses or go around the convexity 39 to flow down to the lower end. Thereafter, the polyurethane raw material expands as sequentially filling the cavity spaces 35, 36 and then 37. Accordingly, the main plate of the seat pad main body 2, extension 4 and the overhang 5 are formed integral with each other. Moreover, the reinforcement member 20 is applied so as to be integral with the back surface (the internal surface in the depression 6 as to the extension 4 and the overhang 5).

After polyurethane foam filled the cavity spaces 35 to 37 is cured, the lid 31 and the bowl 32 are separated from each other to open the mold. Then, the seat pad main body 2 is released from the mold. The groove structure 7, concavity 10 and holes 9 are prepared after released from the mold, which are corresponding to the elongated protrusion 38, the convexity 39, and the raisings 40. Subsequently, finishing operation such as deflashing is carried out if necessary. Thus, a seat pad 1 is completed.

As discussed above, the polyurethane raw material poured into the mold 30 overpasses the horizontally elongated protrusion 38a on the way of flowing down on the cavity bottom surface, and the polyurethane raw material is partially prevented from flowing by the convexity 39 and retained at the lower side of the horizontally elongated protrusion 38a. Therefore, as shown in FIG. 4c, the lower part of the horizontally elongated protrusion 38a is sufficiently filled with polyurethane foam. Accordingly, it is possible to avoid molding failure such as voids at the periphery of the horizontal groove 7a in the completed seat pad main body 2. Namely, the seat pads 1 having high quality can be manufactured with good yield.

In this embodiment, the height $d_3'$ of the convexity 39 is preferably in the range of 10 to 60 mm, particularly preferably in the range of about 20 to 40 mm. Therefore, the polyurethane raw material overpass the horizontally elongated protrusion 38a and the rising 40 provided at the middle of the same with respect to the longitudinal direction of the protrusion 38a. Further, the polyurethane raw material is not excessively prevented from further flowing even by the provision of the convexity 39, and also relatively easily overpasses the convexity 39 to flow to the lower side of the inclined cavity bottom surface. The polyurethane raw material is delivered also to a part behind the convexity 39. In this way, the polyurethane raw material is sufficiently provided to the lower side of the inclined cavity bottom surface.

In this embodiment, the width $W_3$ of the concavity 10 prepared by the convexity 39 is preferably in the range of 2 to 10 mm, and particularly about 3 mm. With such width, the concavity 10 gives no or little mark/effect (such as depression of seat cover material to the concavity 10). Consequently, the seat can be obtained with good aesthetic properties.

Second Embodiment

Figure 5A:
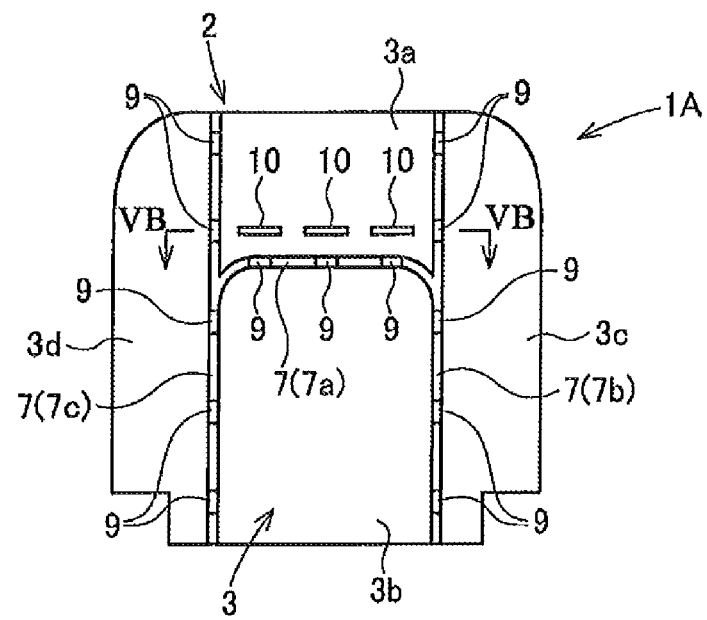
FIG. 5a is a front view of a seat pad according to a second embodiment.
Figure 5B:
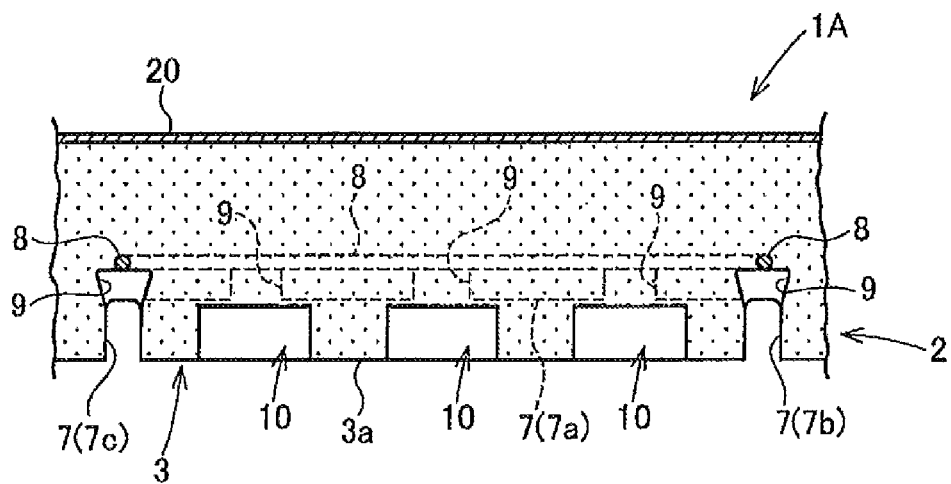
Figure 5C:
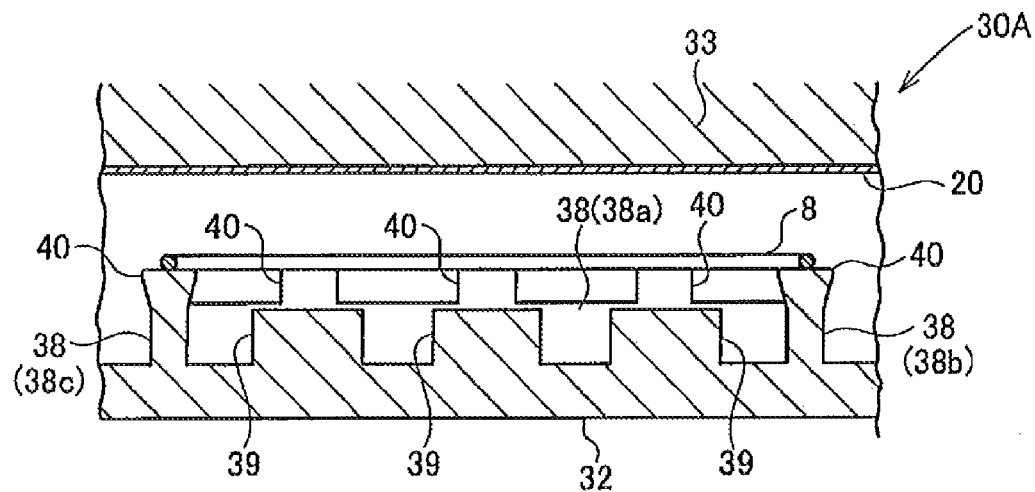
FIG. 5c is a cross section of a mold at the part as shown in FIG. 2c, for explaining a seat pad of FIGS. 5a and 5b in the course of expanding polyurethane raw material in the mold in an foam molding step.

FIG. 5a is a front view of a seat pad according to a second embodiment; FIG. 5b is a cross section of the seat pad along VB-VB line in FIG. 5a; FIG. 5c is a cross section of a mold for forming the seat pad of FIGS. 5a and 5b. Here, FIG. 5c shows a cross section as shown in FIG. 2c.

In the first embodiment, a single concavity 10 is formed so as to face the horizontal groove 7a at the center thereof (the center hole 9). The number of the concavity 10 and the arrangement thereof are not limited to these in the second embodiment. For instance, as in the seat pad 1A in FIGS. 5a and 5b, a plurality of concavities 10, which are spaced apart from one another, can be arranged so that all concavities 10 face the horizontal groove 7a.

In the seat pad 1A, three holes 9 are provided in the horizontal groove 7a with spaced apart from each other in the longitudinal direction of the groove. Three concavities 10 are positioned so as face the holes 9, respectively. Preferable ranges as regards to the size of the convexities 10, the distance between the horizontal groove 7a and the holes 9 and the like are the same as those in the first embodiment.

In the mold 30 for forming the seat pad 1A in accordance with foam molding, three convexities 39 for forming the concavities 10 are provided with spaced apart from each other in a horizontal direction. These convexities 39 are provided on the lower side (corresponding to the upper side of the seat pad main body 2), with respect to the horizontally elongated protrusion 38a, on the inclined cavity bottom surface of the bowl 32. In this embodiment, three risings 40 for forming the holes project from the horizontally elongated protrusion 38a. The convexities 39 are arranged so as to face the risings 40, respectively. The size of the concavities 39, the distance between the horizontally elongated protrusion 38a and the risings 40, and the like are the same as those in the first embodiment.

In the second embodiment, the seat pad 1A, the mold 30A, and the other structures are the same as the seat pad 1, the mold 30, and the other structures in the first embodiment. Further, the reference numerals in FIGS. 5a to 5c which are the same as those in FIGS. 1a to 4c denote the same parts as in the figures.

As discussed above, a plurality of concavities 10 are provided with spaced apart from one another and successively arranged in the longitudinal direction of the horizontal groove 7a. By this arrangement, it is possible to securely prevent the molding failure, over the entire length of the horizontal groove 7a.

Moreover, FIG. 5c shows risings 40 having a relatively large height. In this configuration, in general, the polyurethane raw material is difficult to be delivered to the part lower than risings 40 after flowing down to the lower part of the inclined cavity bottom surface and overpassing the risings 40, in the foam molding step of the seat pad 1A. In this embodiment, however, the convexity provided so as to face the risings 40 prevents the polyurethane raw material from flowing, and the polyurethane raw material can be retained at a part lower than the risings 40. As a result, the part lower than/behind the risings 40 can be sufficiently charged with the expanded polyurethane. Thus, it is possible to satisfactorily avoid the molding failure at the periphery of the holes 9 in the horizontal groove 7a of the molded product. Moreover, since the risings are not connected/communicate with the vertical grooves 7b and 7c, it is possible to avoid defects at the crossings of the horizontal groove 7a with the vertical grooves 7b and 7c.

Third Embodiment

Figure 6A:
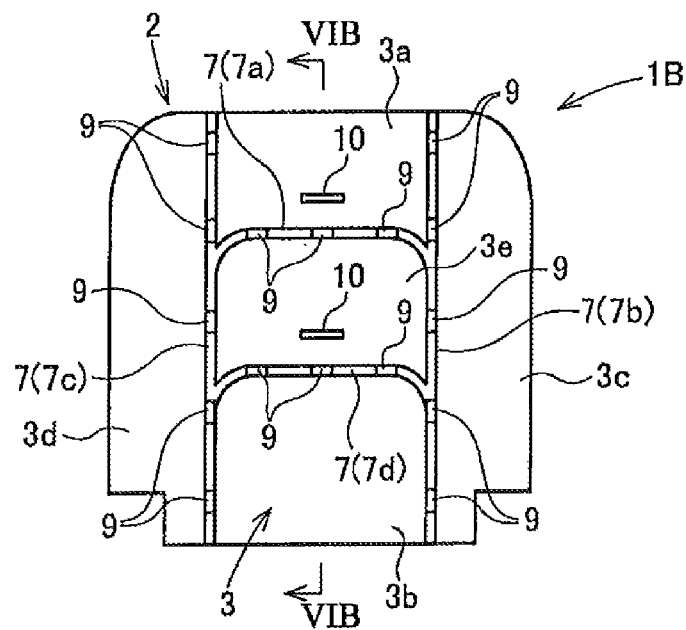
FIG. 6a is a front view of a seat pad according to a third embodiment.
Figure 6B:
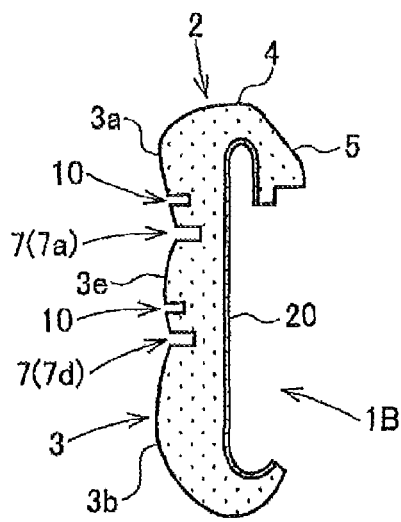
Figure 6C:
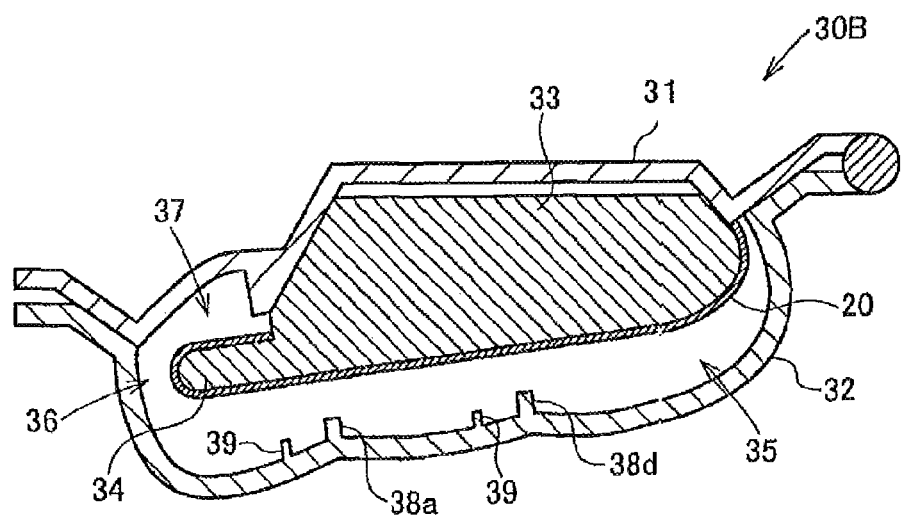
FIG. 6c is a cross section of a mold at the part as shown in FIG. 2a, for explaining a seat pad of FIGS. 6a and 6b in the course of expanding polyurethane raw material in the mold in an foam molding step.
Figure 7A:
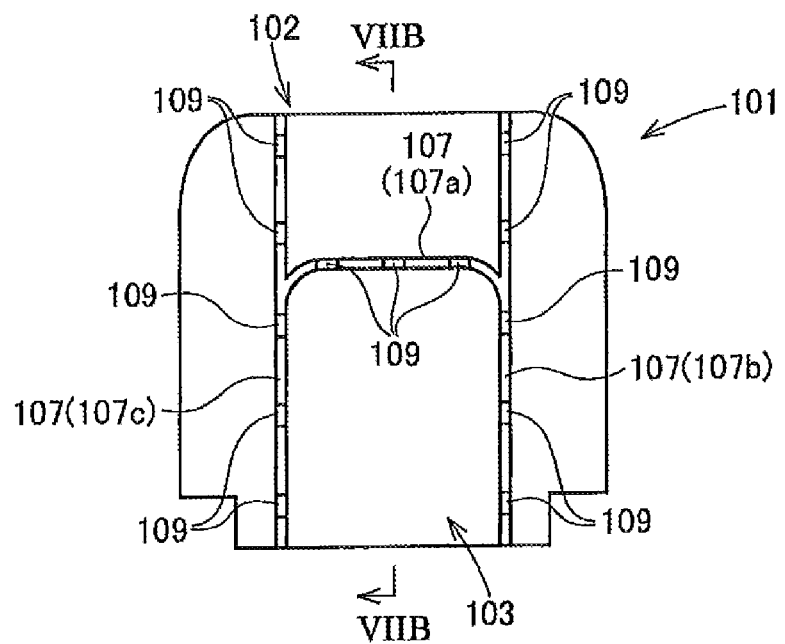
FIG. 7a is a front view of a seat pad as a prior art example.
Figure 7B:
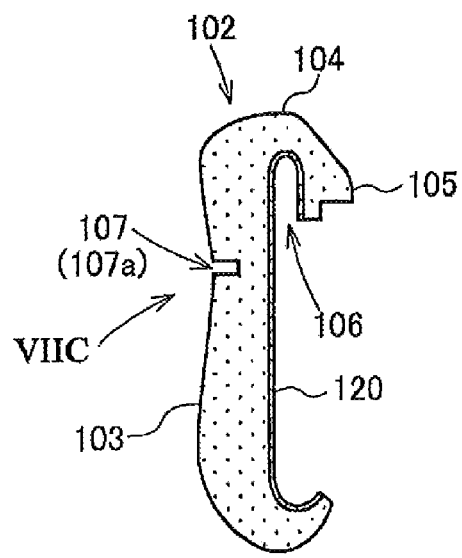
Figure 7C:
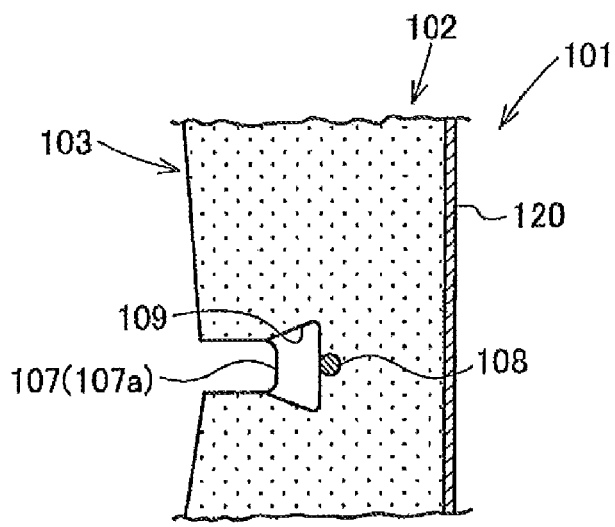
FIG. 7c is an enlarged view of part VIIC in FIG. 7b.
Figure 8A:
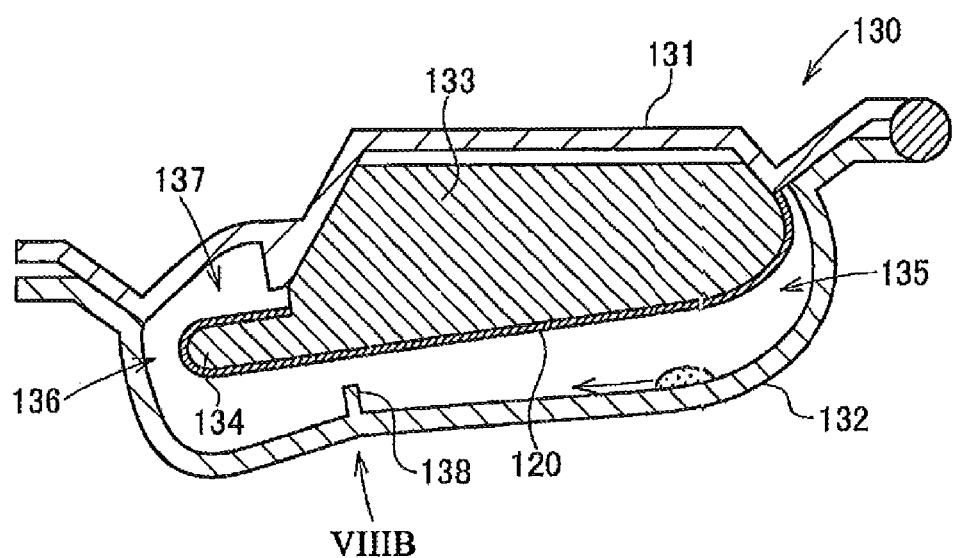
FIG. 8a is an longitudinal cross section of a mold for forming a seat pad of FIGS. 7a to 7c.
Figure 8B:
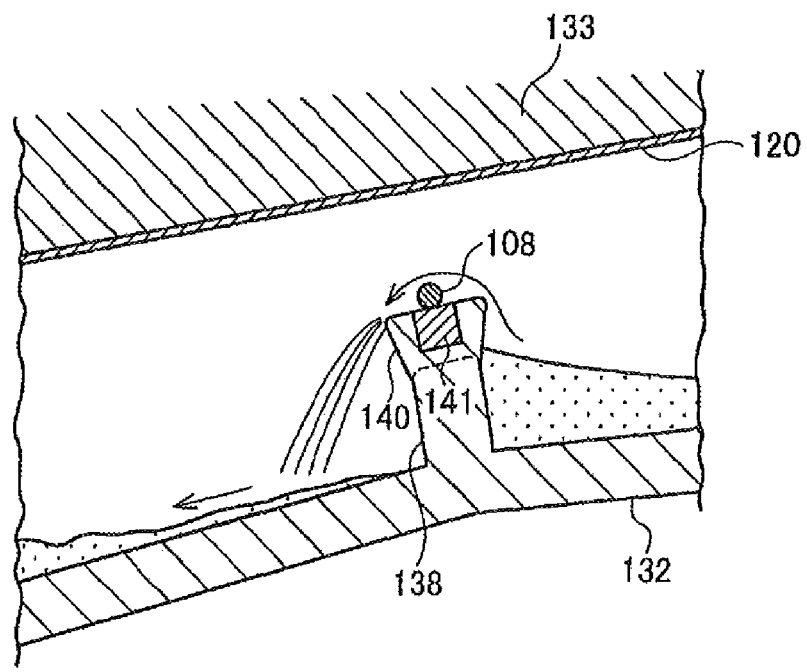
FIG. 8b is an enlarged view of part VIIIB in FIG. 8a for explaining the polyurethane raw material in the course of expansion.
Figure 8C:
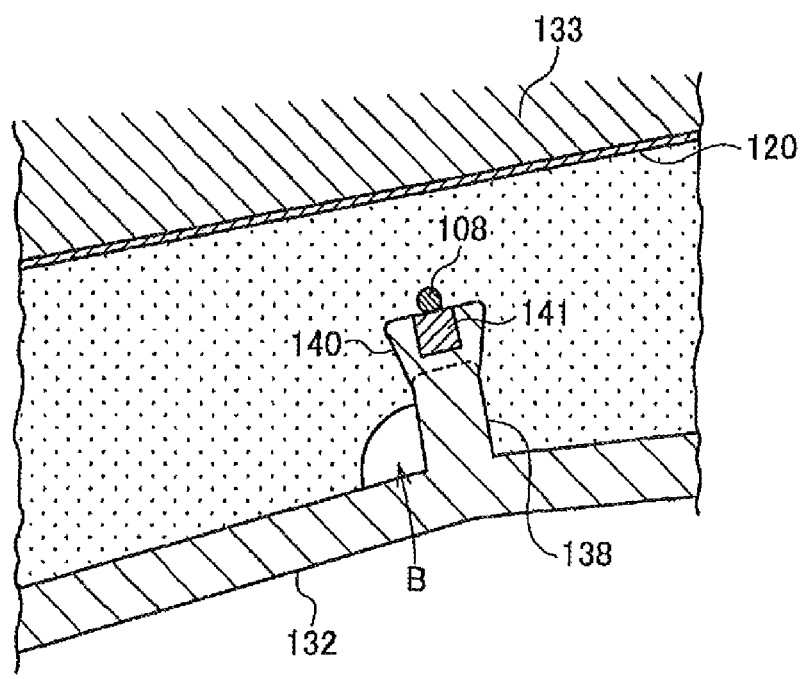
FIG. 8c is an enlarged view of part VIIIB in FIG. 8a after expansion being completed.

FIG. 6a is a front view of a seat pad according to a third embodiment; FIG. 6b is a cross section of the seat pad along VIB-VIB line in FIG. 6a; FIG. 6c is a cross section of a mold for forming the seat pad of FIGS. 6a and 6b. Here, FIG. 6c shows a cross section as shown in FIG. 2c.

In the previous embodiments, a single horizontal groove 7a is provided in the middle, in the vertical direction, of the main plate 3. It is also possible to provide a plurality of horizontal grooves with spaced apart from one another in a vertical direction, as a seat pad 1B shown in FIGS. 6a and 6b.

In the seat pad 1B, two horizontal grooves 7a and 7d are provided with spaced apart from one another in a vertical direction on the front surface of the main plate 3. The main plate 3 is partitioned into an upper back part 3a, a middle back part 3e and a lower back part 3b, sequentially from the top by the horizontal grooves 7a and 7d. More precisely, the upper horizontal groove 7a extends along a boundary between the upper back part 3a and the middle back part 3e, and the lower horizontal groove 7d extends along a boundary between the middle back part 3e and the lower back part 3b. The left and right ends of the horizontal grooves 7a and 7d communicate with the left and right vertical grooves 7b and 7c. In this embodiment, three holes 9 are provided in both the horizontal grooves 7a and 7d, with the holes 9 spaced apart from one another in the longitudinal direction of the grooves. The number of the holes and the arrangement thereof may be different between the upper and lower horizontal grooves 7a and 7b.

In the present embodiment, two concavities 10 are provided which face the horizontal grooves 7a and 7d, respectively. The concavity 10 which faces the upper horizontal groove 7a is provided on the front surface of the upper back part 3a located on the upper side of the horizontal groove 7a. Moreover, the concavity 10 which faces the lower horizontal groove 7d is provided on the front surface at the middle back part 3e located between the horizontal grooves 7a and 7d. In this embodiment, the concavities 10 are in the form of grooves extending in a horizontal direction, and arranged so as to face the horizontal grooves 7a and 7d at the middle (the center hole 9) in the longitudinal direction thereof. The preferable ranges as regards to the size of the concavities 10, the distance between the horizontal grooves 7a and 7d and the holes 9 facing one another, and the like are the same as those in the first embodiment.

A horizontally elongated protrusion 38a for forming the upper horizontal groove 7a and a horizontally elongated protrusion 38d for forming the lower horizontal groove 7d are provided on the cavity bottom surface in a mold 30B, in the mold 30B for forming the seat pad 1B in accordance with foam molding. The horizontally elongated protrusion 38a is provided on the upper side of the inclined cavity bottom surface with respect to the horizontally elongated protrusion 38a. The convexities 39 for forming concavities are provided on the lower sides of the horizontally elongated protrusions 38a and 38d so as to face the center (rising 40 for forming the center hole) of the horizontally elongated protrusions 38a and 38d. The preferable ranges as regards to the size of the size of the convexities 39, the distance between the horizontally elongated protrusions 38a and 38d and the risings 40 are the same as those in the previously discussed embodiments.

In the third embodiment, the seat pad 1B, the mold 30B, and the other structures are the same as the seat pad 1, the mold 30, and the other structures in the first embodiment. Further, the reference numerals in FIGS. 6a to 6c which are the same as those in FIGS. 1a to 4c denote the same parts as in the figures.

Two horizontally elongated protrusions 38a and 38d are provided on the cavity bottom surface, with spaced apart from one another in a vertical direction of the seat pad main body 2. The convexities 39 are provided on the lower side of the protrusions 38a and 38d, respectively, so as to face the same. The convexity 39 prevents the polyurethane raw material from flowing, and the polyurethane raw material can be retained at a part lower than the horizontally elongated protrusions 38a and 38b. As a result, the part lower than/behind the risings 40 can be sufficiently charged with the expanded polyurethane. Thus, the molding failure is satisfactorily prevented from occurring at the periphery of the horizontal groove 7a of the molded product.

Here, it is possible to prepare three or more horizontal grooves. Furthermore, two or more concavities 10 can be formed so as face the horizontal grooves, in the same way as in the embodiment shown in FIGS. 5a to 5c.

Other Structure

In the above embodiments, the convexities 39 for forming the concavities have a thickness $W_3'$ which is uniform from the lower end to the upper end. Alternatively, the convexities 39 may have a thickness $W_3'$ which gradually decreases towards the lower end. With such configuration, the concavity 10 formed by the convexity 39 has a shape with a small width at the mouth of the concavity 10. Therefore, when the seat cover material is applied on the above-mentioned seat pad 1, the concavity 10 is made inconspicuous.

[Application to Cushion Pad and a Method for Manufacturing the Same]

The present invention is applicable to a cushion pad for constituting a seat of a seat, and a method for manufacturing the same.

Generally speaking, the cushion pad has such a shape that the front end of the seat surface is higher than the rear end thereof. The cushion pad is formed in accordance with foam molding in a mold with the seat surface maintained to face in a downward direction, the foam molding performed with a front end of the seat surface positioned lower than the rear end thereof. In the mold for forming the cushion pad, the cavity bottom surface is inclined so as to have a front end of the cushion pad lower than the rear end thereof.

When the present invention is applied to the cushion pad and the method for manufacturing the same, a convexity for forming the concavity is provided so as to be positioned on the lower side of the inclined cavity bottom surface compared to the horizontally elongated protrusion for forming the horizontal groove, and faces the horizontally elongated protrusion. Accordingly, the convexity prevents the polyurethane raw material from flowing, and the polyurethane raw material can be retained at a part lower than the protrusion after the polyurethane raw material is charged to the mold for foam molding of the cushion pad. As a result, the part lower than the horizontally elongated protrusion is sufficiently charged with the expanded polyurethane. Thus, it is possible to avoid the molding failure at the periphery of the horizontal groove in the molded cushion pad.

The above embodiments are only for exemplary purpose, and the present invention is not limited to the embodiments explained with referring to the figures.

EXPLANATION OF REFERENCE NUMERALS 1, 1A, 1B seat pad
2 seat pad main body
3 main plate
4 extension
5 overhang
6 depression
7 groove structure
7a, 7d horizontal groove
9 hole for engagement with engagement tool
10 concavity for avoiding molding failure
11 reinforcement member
30 mold
31 lid
32 bowl
33 tongue
35 to 37 cavity space
38 groove formation protrusion
38a, 38d horizontally elongated protrusions
39 convexity for forming concavity
40 rising for forming hole The present invention has been explained in detail as to a particular embodiment. It is obvious for those skilled in the art that various modification is applicable to the invention without deviated from the intension and the scope of the invention.

The present invention is based on Japanese Patent Application (Japanese Patent Application 2010-213766) filed on Sep. 24, 2010. The entire application is incorporated by reference to the present application.

The invention claimed is:

1. A method for manufacturing a seat pad comprising the step of foam molding the seat pad by pouring a raw material into a mold and by curing the raw material in the mold,
   wherein the seat pad comprises:
   a seat surface for seating configured to have at least a seat cover material thereon;
   side support parts provided on both sides defining a lateral direction of the seat pad;
   a groove structure for containing a part of the seat cover material, at least a part of the groove structure being formed as a lateral groove which extends in the lateral direction on the seat surface, and
   at least one concavity provided between the first end and the lateral groove, extending along the lateral groove, and being separated from the lateral groove by a distance $S_1$ of 20 mm to 80 mm,
   wherein the mold is structured for molding the seat pad with the seat surface facing in a downward direction,
   when pouring the raw material, a cavity bottom surface of the mold is inclined so that the first end of the seat surface is positioned lower than the second end thereof, the cavity bottom surface comprises:
   a protrusion for forming the groove of the seat pad,
   a laterally elongated protrusion for forming the lateral groove of the seat pad which consists of a part of the protrusion extending in the lateral direction when the seat pad is viewed in a position for use, and
   a convexity for forming the concavity of the seat pad, which is positioned between the first end and the laterally elongated protrusion, and faces the laterally elongated protrusion, and
   a distance $S_1'$ between the convexity and the laterally elongated protrusion is 20 mm to 80 mm,
   wherein a rising is provided on the laterally elongated protrusion at a position in front of the convexity, and
   the raw material is poured in a state when an engagement member is arranged on a top end of the rising.

2. The method for manufacturing the seat pad as claimed in claim 1, wherein the height of the convexity measured from the cavity bottom surface is less than that of the elongated protrusion measured therefrom.

* * * * *